UNITED STATES PATENT OFFICE.

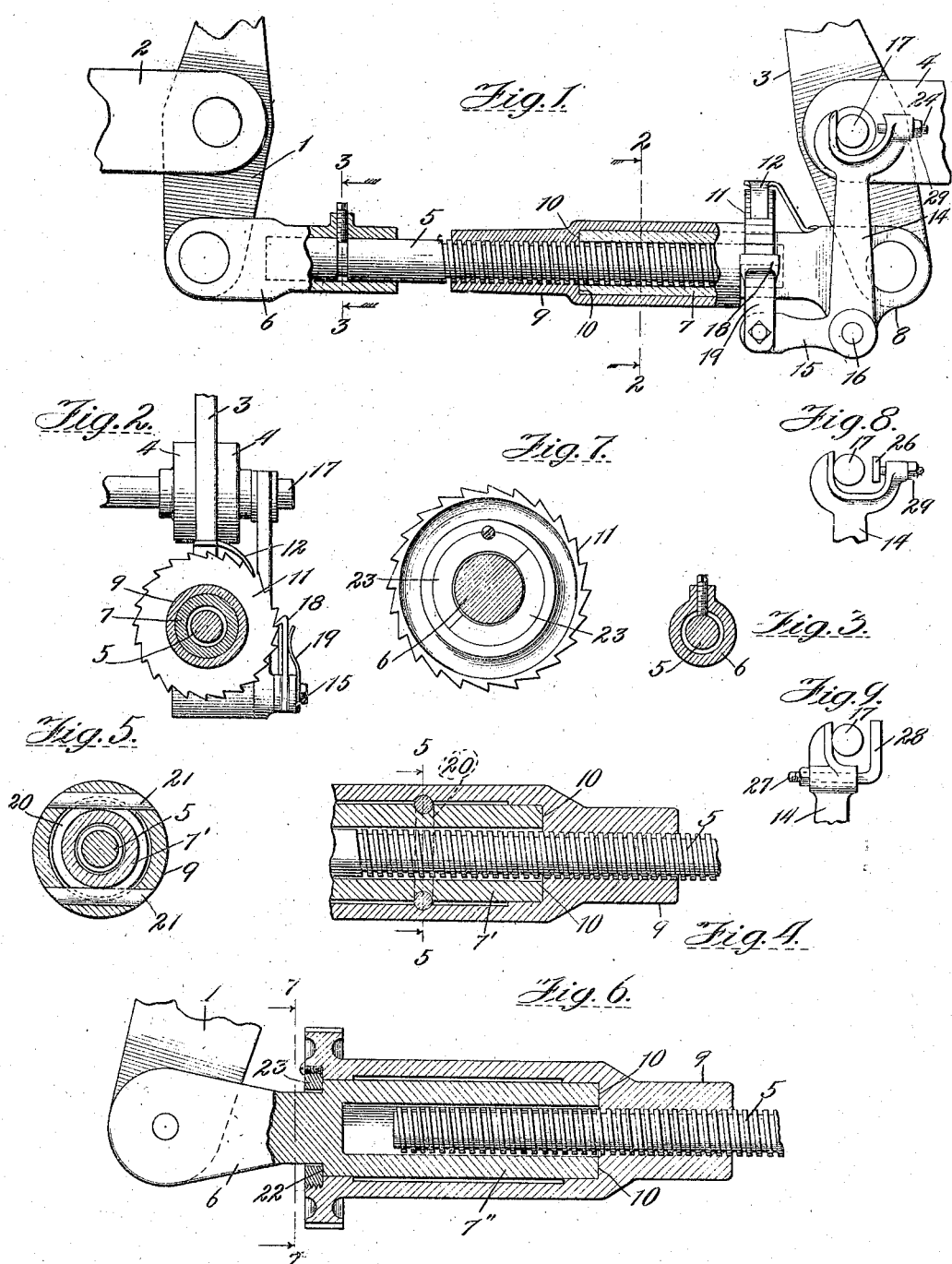

CHARLES OSCAR ANDERSON, OF OMAHA, NEBRASKA, ASSIGNOR OF ONE-HALF TO A. T. AUSTIN, OF OMAHA, NEBRASKA.

AUTOMATIC SLACK-ADJUSTER.

No. 893,220.   Specification of Letters Patent.   Patented July 14, 1908.

Application filed January 28, 1907. Serial No. 354,431.

*To all whom it may concern:*

Be it known that I, CHARLES OSCAR ANDERSON, a citizen of the United States, residing at Omaha, in the county of Douglas and State of Nebraska, have invented certain new and useful Improvements in Automatic Slack-Adjusters, of which the following is a description.

My invention relates to means for adjusting the members, or "taking up the slack," in brake rigging, and may be advantageously employed upon any of the usual kinds of hand or power operated brakes.

The object of my invention is to provide a simple, accurate, and durable device of the kind described, and one requiring practically no attention except when it is necessary to renew the brake shoes.

To this end my invention consists in the novel construction arrangement, and combination of parts herein shown and described and more particularly pointed out in the claims.

In the accompanying drawings, wherein like or similar reference characters indicate like or corresponding parts; Figure 1 is an elevation of my device with parts removed and broken away to more clearly show the construction. Fig. 2 is a section taken substantially on line 2—2 of Fig. 1. Fig. 3 is a section taken substantially on line 3—3 of Fig. 1. Fig. 4 is an enlarged partial section showing a slightly modified form of my device. Fig. 5 is a section taken substantially on line 5—5 of Fig. 4. Fig. 6 is an enlarged elevation similar to that shown in Fig. 1, showing a slight modification. Fig. 7 is a section taken substantially on line 7—7 of Fig. 6. Figs. 8 and 9 are details showing slightly modified forms of mechanism for operating my device.

My device consists broadly of means for automatically adjusting the connection between the brake shoe and actuating mechanisms at opposite ends of the truck and may be operated either in tension or compression as required upon the various styles of brake mechanisms.

In the form shown my device is attached to a simple form of "inside hung" brake rigging in which 1 is the dead lever, as usually employed, pivotally connected intermediate its ends to the brake beams 2 the upper end of the le er, which is broken away in the drawings, being attached to a portion of the car framing in the ordinary manner. The live lever 3 is suitably connected to a brake beam 4 and at its upper end which is also broken away in the drawings is connected to any desired form of operating mechanism in the usual or in any preferred manner; and my improved slack adjuster is employed to pivotally connect the lower ends of the levers 1 and 3.

In the form shown in the drawings, my device comprises a threaded rod or screw 5 provided at one end with the jaw 6 for pivotally attaching the same to the lever 1. A tubular member 7 incloses a portion of the opposite or threaded portion of the screw 5 and at its extremity is provided with a jaw 8 pivotally engaging the extremity of the lever 3, the interior of the tubular member 7 being merely a snug sliding fit upon screw 5. A threaded sleeve 9 is rotatively mounted jointly upon the screw 5 and tubular member 7 with its threaded part engaging the threads of the screw and with a shoulder as at 10 adapted to engage the end of the tubular member 7 to control its position upon the screw and thus the length of the device, or the distance between the levers 1 and 3. A ratchet wheel 11 is rigidly mounted upon the threaded sleeve 9 and a spring actuated pawl 12 is mounted upon the member 7 in position to engage the teeth of the ratchet wheel and prevent its rotation in one direction.

Obviously the natural wear upon the brake shoes and other portions of the brake rigging will gradually tend to increase the movement of the levers 1 and 3 when setting the brake and it is the function of my device to gradually increase the distance between the free ends of these levers, in the form shown, to compensate for this wear. So long as the levers 1 and 3 move only the desired distance in setting the brakes no adjustment is required but as soon as the travel of the lever 3 becomes excessive such unusual or excessive movement of the lever will operate the mechanism of my device and adjust the length of the connection between the levers until the movement is again normal. Any suitable mechanism may be employed for this purpose. As shown a bell crank lever 14, 15 is pivotally mounted upon the member 7 at 16, and the extremity of the arm 14, as shown in Fig. 1, is forked to engage the opposite sides of a pin 17 or other suitable part of the lever 3. A pawl 18 is attached to the extremity of the arm 15 to engage the ratchet 11, and a spring 19 is provided to normally hold the pawl in engagement with the ratchet.

The several parts of my device are so formed and proportioned that when the lever 3 is in normal release position the pin 17 will engage one of the forks of the lever 14 and when the brakes are set the pin 17 will engage the opposite arm but if the movement of the lever is not excessive no operative movement of the pawl 18 will occur. If however the movement of the lever 3 is excessive, when the lever is moved to set the brakes the pin 17 engages and moves the arm 14 sufficiently to cause the pawl 18 to engage the next tooth of the ratchet 11 and when the brakes are next released the pin 17 will engage the opposite fork of the arm 14 and rotate the ratchet 11 and sleeve 9 thus adjusting the length of the connection between the levers.

Where my device is employed for inside brakes as shown in Fig. 1, it is obvious that the usual brake release springs will tend to prevent any longitudinal movement between the tubular member 7 and the threaded sleeve 9, but if preferred any suitable means may be provided to positively prevent such movement. In Figs. 4 and 5 an annular groove 20 is provided in the member 7 and a pair of pins 21—21 are positioned in suitable openings in the threaded sleeve in position to engage the groove 20 and prevent such longitudinal movement.

In the form shown in Figs. 6 and 7 the diameter of the tubular member 7″ is reduced next to the jaw 8 to form a shoulder 22. The threaded sleeve 9 is of sufficient length to extend slightly beyond the shoulder 22 and is provided with a split collar or other suitable means 23 rigidly secured in position in the sleeve and adapted to engage the shoulder 22, thus providing a strong and durable means to prevent such longitudinal movement.

Obviously it would be extremely difficult to suitably space the forks upon the lever 14 to satisfactorily operate with all the various forms of brake rigging and for this reason suitable adjusting means is provided for adjusting the operative distance between the forks. In the form shown in Fig. 1 a set-screw 24 is provided upon one of the forks with one end in position to engage the pin 17 for this purpose.

In Fig. 8 a T headed bolt 26 is provided in place of the set-screw 24, and in Fig. 9 the lever is simply curved and a bolt 27 is provided with an arm 28 formed to serve as the other fork of the lever. In each case suitable jam-nuts or equivalent means 29 are provided to prevent accidental movement of the fork adjusting means.

In the foregoing specification and in the drawings only the preferred form of my device is shown, and it is obvious that various immaterial modifications may be made in my device without departing from the spirit of my invention, hence I do not wish to be understood as limiting myself to the exact form and construction shown.

What I claim as new, and desire to secure by Letters Patent is:—

1. In a slack adjuster for brake rigging, a pivoted lever, means connecting said lever to other parts of said brake rigging, comprising a screw, a tubular member, a threaded sleeve rotatably connected with, and partially inclosing, said tubular member, and mounted upon said screw, with the threaded sleeve engaging the threads thereof, in combination with means adapted to be operated by the movement of said lever for rotating said threaded sleeve to adjust the length of said connecting means.

2. In a slack adjuster for brake rigging, a pivoted lever, means connecting said lever to other parts of said brake rigging, comprising a screw, a tubular member, a threaded sleeve rotatably connected to said tubular member and both mounted upon said screw with the threaded sleeve engaging the threads thereof, and a ratchet wheel rigidly mounted upon said threaded sleeve, in combination with means mounted upon said tubular member and adapted to be operated by the movement of said lever for engaging said ratchet and rotating said threaded sleeve, whereby the length of said connecting means will be adjusted.

3. In a slack adjuster for brake rigging, a pivoted lever, means connecting said lever to other parts of the brake rigging, comprising a screw, a tubular member, a threaded sleeve rotatably connected to said tubular member and both mounted upon said screw with the threaded sleeve engaging the threads thereof, in combination with a ratchet wheel rigidly mounted upon said threaded sleeve, a bell crank mounted upon said tubular member, a pawl attached to one arm of said bell crank and adapted to engage said ratchet to rotate the same, a part upon the lever adapted to engage the other arm of said bell crank to operate the same thereby rotating said threaded sleeve and adjusting the length of said connecting means.

4. In a slack adjuster for brake rigging, a pivoted lever, means connecting said lever to other parts of said brake rigging, comprising a screw, a tubular member, a threaded sleeve rotatably connected to said tubular member and both mounted upon said screw with a part of the threaded sleeve engaging the threads thereof, a ratchet wheel rigidly mounted upon said threaded sleeve, means for preventing the rotation of said sleeve in one direction and means adapted to be operated only by excessive movement of said lever for engaging said ratchet and rotating said threaded sleeve, thereby adjusting the length of said connecting means.

5. In a slack adjuster for brake rigging, a pivoted lever, means connecting said lever to other portions of said brake rigging, comprising a screw, a tubular member, a threaded sleeve rotatably connected to said tubular member and both mounted upon said screw, with a part of said threaded sleeve engaging the threads thereof, a ratchet wheel rigidly mounted upon said threaded sleeve, a pawl mounted upon said tubular member for preventing rotation of said ratchet wheel in one direction, and means also mounted upon said tubular member and adapted to be operated only by excessive movement of said lever for engaging said ratchet and rotating said threaded sleeve, thereby adjusting the length of said connecting means.

6. In a slack adjuster for brake rigging, a pivoted lever, means connecting said lever to other parts of said brake rigging, comprising a tubular member, a screw, a threaded sleeve, rotatably connected to said tubular member and both mounted upon said screw, with a part of said threaded sleeve engaging the threads thereof, means for preventing longitudinal movement between said sleeve and said tubular member and means operated only by excessive movement of said lever for rotating said threaded sleeve, thereby adjusting the length of said connecting means.

7. In a slack adjuster for brake rigging, a pivoted lever, means for connecting said lever to other parts of said brake rigging, comprising a screw, a tubular member, a threaded sleeve rotatably mounted jointly upon said screw and said tubular member with its threaded part engaging said screw, in combination with a ratchet wheel upon said threaded sleeve and means adapted to be operated by the movement of said lever for engaging said ratchet and rotating said sleeve, thereby adjusting the length of said connecting means.

8. In a slack adjuster for brake rigging, a pivoted lever, means for connecting said lever to other parts of said brake rigging, comprising a screw, a tubular member, a threaded sleeve rotatably mounted jointly upon said screw and said tubular member with its threaded part engaging said screw, and means to prevent longitudinal movement between said tubular member and said sleeve, in combination with a ratchet wheel upon said sleeve and means adapted to be operated by the movement of said lever for engaging said ratchet wheel and rotating said sleeve thereby adjusting the length of said connecting means.

9. In a slack adjuster for brake rigging, a pivoted lever, means for connecting said lever to other parts of said brake rigging, comprising a screw, a tubular member inclosing a part of said screw, a threaded sleeve rotatably mounted jointly upon said screw and said tubular member with its threaded part engaging said screw, in combination with means adapted to be operated by the movement of said lever for rotating said sleeve, thereby adjusting the length of said connecting means.

10. In a slack adjuster for brake rigging, a pivoted lever, means for connecting said lever to other parts of said brake rigging, comprising a screw, a tubular member inclosing a part of said screw, a threaded sleeve rotatably mounted jointly upon said screw and said tubular member with its threaded part engaging said screw, and means to prevent longitudinal movement between said tubular member and said sleeve, in combination with means adapted to be operated by the movement of said lever for rotating said sleeve, thereby adjusting the length of said connecting means.

In testimony whereof, I have hereunto signed my name in the presence of two subscribing witnesses:

CHARLES OSCAR ANDERSON.

Witnesses:
BURTON U. HILLS,
CHARLES I. COBB.